(12) United States Patent
Tokura

(10) Patent No.: US 9,671,677 B2
(45) Date of Patent: Jun. 6, 2017

(54) FOCAL-PLANE SHUTTER AND OPTICAL APPARATUS

(71) Applicant: SEIKO Precision Inc., Matsudo-shi, Chiba (JP)

(72) Inventor: Shoichi Tokura, Matsudo (JP)

(73) Assignee: SEIKO PRECISION INC., Matsudo-shi, Chiba (JP)

( * ) Notice: Subject to any disclaimer, the term of this patent is extended or adjusted under 35 U.S.C. 154(b) by 0 days.

(21) Appl. No.: 15/287,060

(22) Filed: Oct. 6, 2016

(65) Prior Publication Data
US 2017/0131619 A1 May 11, 2017

(30) Foreign Application Priority Data

Nov. 5, 2015 (JP) ................................. 2015-217446

(51) Int. Cl.
*G03B 9/32* (2006.01)
(52) U.S. Cl.
CPC ..................... *G03B 9/32* (2013.01)
(58) Field of Classification Search
CPC ................................................. G03B 9/32
USPC ............................................... 396/480, 487
See application file for complete search history.

(56) References Cited

U.S. PATENT DOCUMENTS 6,805,500 B2 * 10/2004 Miyazaki ................. G03B 9/40
348/229.1

FOREIGN PATENT DOCUMENTS

JP    2014-186126 A    10/2014

* cited by examiner

*Primary Examiner* — Rochelle-Ann J Blackman
(74) *Attorney, Agent, or Firm* — Brinks Gilson & Lione

(57) ABSTRACT

A focal-plane shutter capable of stabilizing a curtain in continuous photographing action for suppression of variation in light exposure period is provided. The focal-plane shutter includes a base plate having a first opening, a blade receiving plate so arranged as to face the base plate and having a second opening formed in a position corresponding to the first opening, and a rear curtain that is arranged between the base plate and the blade receiving plate and moves between an open position where the first opening and the second opening are open and a closed position where the first opening and the second opening are closed to open and close the first opening and the second opening. The blade receiving plate has a protruding section in a position where the blade receiving plate overlaps with the rear curtain located in the open position when viewed along the optical axis direction, and the protruding section so protrudes toward the rear curtain as to allow the rear curtain to come into contact with the protruding section.

9 Claims, 10 Drawing Sheets

FOCAL-PLANE SHUTTER AND OPTICAL APPARATUS

RELATED APPLICATIONS

This application claims priority under 35 U.S.C. §119 to Japanese Patent Application No. 2015-217446 filed on Nov. 5, 2015, the entire content of which is hereby incorporated by reference.

BACKGROUND OF THE INVENTION

Field of the Invention

The present invention relates to a focal-plane shutter and an optical apparatus.

Background Art

An optical apparatus, for example, a digital camera and a still camera, employs a focal-plane shutter. The focal-plane shutter includes a substrate having an opening and a curtain that opens and closes the opening (see JP-A-2014-186126, for example).

The focal-plane shutter exposes an imaging device to light (performs light exposure on imaging device) on the basis of movement of the curtain. The curtain moves between a closed position where the opening of the substrate is closed and an open position where the opening is open. When the light exposure is continuously performed (in continuous photographing action), the curtain moves from the closed position to the open position, and after a predetermined period elapses in the open position, the curtain starts moving back to the closed position. The curtain having moved from the closed position to the open position is deformed due to inertia of the curtain during the movement in some cases. The deformed curtain is displaced from a default position in the optical axis direction.

Focal-plane shutters in recent years are required to shorten the curtain action interval in continuous photographing action for an increase in the number of frames that can be photographed per unit period (frame rate).

When the curtain action interval is shortened, however, the curtain starts moving to the closed position before the displacement in the optical axis direction due to the deformation is eliminated in the open position. The curtain therefore moves in an unstable state, resulting in variation in the light exposure period in some cases. Focal-plane shutters of related art therefore have room for improvement in stableness of the curtain in continuous photographing action for suppression of variation in light exposure period.

SUMMARY OF THE INVENTION

The invention provides a focal-plane shutter and an optical apparatus capable of stabilizing a curtain in continuous photographing action for suppression of variation in light exposure period.

A focal-plane shutter according to the invention includes a first substrate having a first opening, a second substrate so arranged as to face the first substrate and having a second opening formed in a position corresponding to the first opening, and a curtain that is arranged between the first substrate and the second substrate and moves between an open position where the first opening and the second opening are open and a closed position where the first opening and the second opening are closed to open and close the first opening and the second opening. The second substrate has a protruding section in a position where the second substrate overlaps with the curtain located in the open position when viewed along an optical axis direction, and the protruding section so protrudes toward the curtain as to allow the curtain to come into contact with the protruding section.

According to the invention, since the protruding section, which protrudes toward the curtain and allows the curtain to come into contact with the protruding section, is provided in the position where the second substrate overlaps with the curtain located in the open position when viewed along the optical axis direction, causing the curtain to come into contact with the protruding section in the open position allows restriction of displacement of the curtain in the optical axis direction. As a result, after the displacement of the curtain in the optical axis direction is eliminated in the open position, the curtain is allowed to move to the closed position. The curtain can therefore be stabilized in the continuous photographing action, whereby variation in light exposure period can be suppressed.

The focal-plane shutter described above desirably further includes a partitioning plate arranged between the first substrate and the second substrate, and it is desirable that the curtain includes a rear curtain that terminates light exposure, that the partitioning plate is formed with a clearance section in which the protruding section is arranged, and that the protruding section protrudes toward the rear curtain and allows the rear curtain to come into contact with the protruding section in a position where the second substrate overlaps with the rear curtain located in the open position when viewed along the optical axis direction.

In general, the rear curtain moves from the open position to the closed position in the light exposure action. According to the invention, the protruding section arranged in the clearance section can prevent the rear curtain located in the open position from being displaced in the optical axis direction. As a result, after the displacement of the rear curtain in the optical axis direction is eliminated in the open position, the rear curtain is allowed to move toward the closed position. The rear curtain can therefore be stabilized in the continuous photographing action, whereby variation in light exposure period can be suppressed.

The focal-plane shutter described above desirably further includes a partitioning plate arranged between the first substrate and the second substrate, and it is desirable that the curtain includes a front curtain that starts light exposure, that the partitioning plate is formed with a clearance section in which the protruding section is arranged, and that the protruding section protrudes toward the front curtain and allows the front curtain to come into contact with the protruding section in a position where the second substrate overlaps with the front curtain located in the open position when viewed along the optical axis direction.

According to the invention, the protruding section can prevent the front curtain located in the open position from being displaced in the optical axis direction. As a result, after the displacement of the front curtain in the optical axis direction is eliminated in the open position, the front curtain is allowed to move toward the closed position. The front curtain can therefore be stabilized in the continuous photographing action, whereby the continuous photographing action can be smoothly performed.

In the focal-plane shutter described above, the protruding section is desirably formed of a plurality of protruding sections.

According to the invention, since the displacement of the curtain in the optical axis direction can be restricted at a plurality of locations, the displacement of the curtain in the optical axis direction can be reliably eliminated in the open position. The curtain can therefore be stabilized in the continuous photographing action, whereby variation in light exposure period can be suppressed.

In the focal-plane shutter described above, it is desirable that the curtain has blades that retract in the open position with the blades overlapped with each other, that the blades extend along a predetermined direction that intersects a direction in which the curtain moves from the open position to the closed position, and that the protruding sections are arranged in the predetermined direction.

According to the invention, since the protruding sections are arranged in the direction in which the blades extend, the displacement of the blades in the optical axis direction can be restricted over a wider range, whereby the displacement of the curtain in the optical axis direction can be reliably eliminated in the open position. The curtain can therefore be stabilized in the continuous photographing action, whereby variation in light exposure period can be suppressed.

In the focal-plane shutter described above, it is desirable that the curtain has blades that retract in the open position with the blades overlapped with each other, that the blades extend along a predetermined direction that intersects a direction in which the curtain moves from the open position to the closed position, and that the protruding section extends along the predetermined direction.

According to the invention, since the protruding section extends in the direction in which the blades extend, the displacement of the blades in the optical axis direction can be restricted over a wider range, whereby the displacement of the curtain in the optical axis direction can be reliably eliminated in the open position. The curtain can therefore be stabilized in the continuous photographing action, whereby variation in light exposure period can be suppressed.

In the focal-plane shutter described above, a front end portion of the protruding section is desirably formed with an inclined surface that so inclines as to separate away from the second substrate but approach the first substrate with distance from a side facing the closed position toward a side facing the open position.

According to the invention, since the inclined surface, which causes the gap between the curtain and the protruding section in the optical axis direction to decrease as the curtain moves from the closed position toward the open position, is formed at the front end portion of the protruding section, the curtain is allowed to slide along the inclined surface even when the curtain moves from the closed position to the open position and comes into contact with the front end portion of the protruding section. As a result, the curtain is not caught by the protruding section but is allowed to move, whereby the continuous photographing action can be smoothly performed.

In the focal-plane shutter described above, a front end portion of the protruding section is desirably so formed as to be separate from the curtain located in the open position by a predetermined gap.

According to the invention, since the front end portion of the protruding section is so formed as to be separate from the curtain located in the open position by a predetermined gap, a situation in which the curtain keeps in contact with the protruding section can be avoided. Therefore, foreign matter is not produced due to sliding contact between the curtain and the protruding section, or the curtain is not scratched. Further, when the curtain moves from the closed position toward the open position, the curtain can readily enter the space between the first substrate and the protruding section. The continuous photographing action can therefore be smoothly performed.

An optical apparatus according to the invention includes any of the focal-plane shutters described above.

According to the invention, an optical apparatus capable of suppressing variation in light exposure period can be provided.

According to the invention, since the protruding section, which protrudes toward the curtain and allows the curtain to come into contact with the protruding section, is provided in the position where the second substrate overlaps with the curtain located in the open position when viewed along the optical axis direction, causing the curtain to come into contact with the protruding section in the open position allows restriction of displacement of the curtain in the optical axis direction. As a result, after the displacement of the curtain in the optical axis direction is eliminated in the open position, the curtain is allowed to move to the closed position. The curtain can therefore be stabilized in the continuous photographing action, whereby variation in light exposure period can be suppressed.

DETAILED DESCRIPTION OF THE INVENTION

An embodiment of the invention will be described below with reference to the drawings.
(Optical Apparatus)

Figure 1:
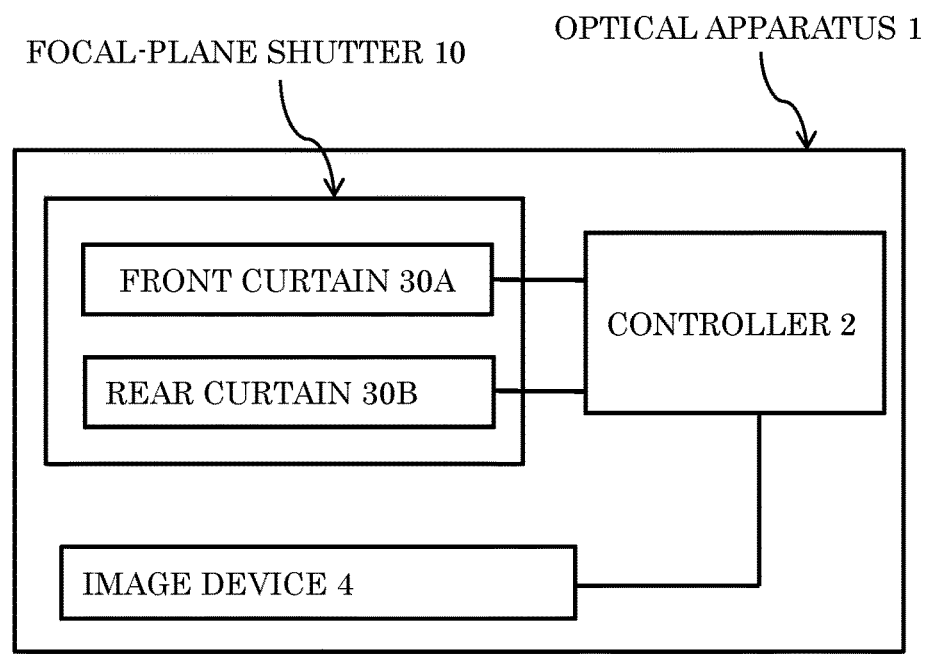
FIG. 1 is a block diagram of an optical apparatus according to an embodiment.

FIG. 1 is a block diagram of an optical apparatus.

An optical apparatus 1 is, for example, a digital camera or a still camera and includes a controller 2, an imaging device 4, and a focal-plane shutter 10, as shown in FIG. 1.

The controller 2 controls the overall action of the optical apparatus 1 and includes a CPU (central processing unit), a ROM (read only memory), a RAM (random access memory), and other components. The controller 2 controls the action of the focal-plane shutter 10, which will be described later.

The imaging device 4 is, for example, a CCD (charge coupled device) or a CMOS (complementary metal oxide semiconductor) image sensor and converts a subject image formed by light into an electric signal.

The optical apparatus 1 further includes, although not shown in FIG. 1, a lens and other components for focal length adjustment.

(Focal-Plane Shutter)

Figure 2:
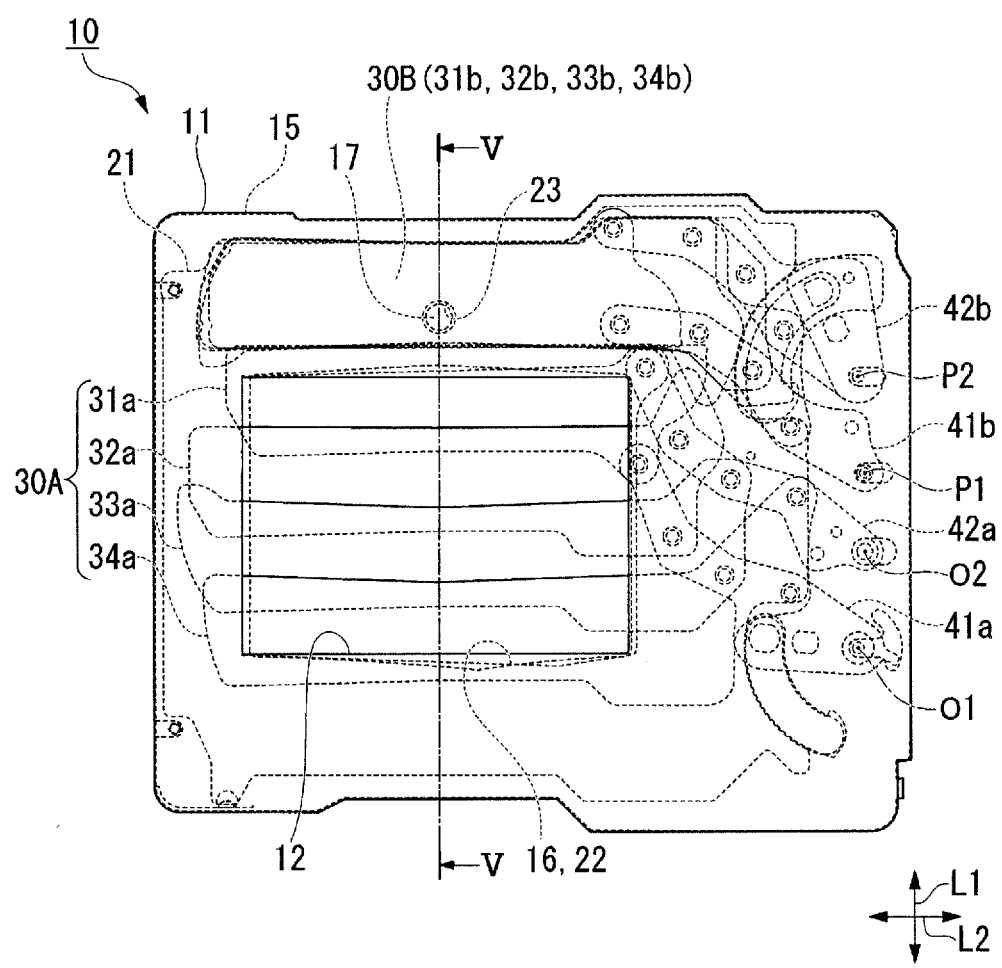
FIG. 2 is a front view of a focal-plane shutter according to the embodiment and shows an initial state.
Figure 3:
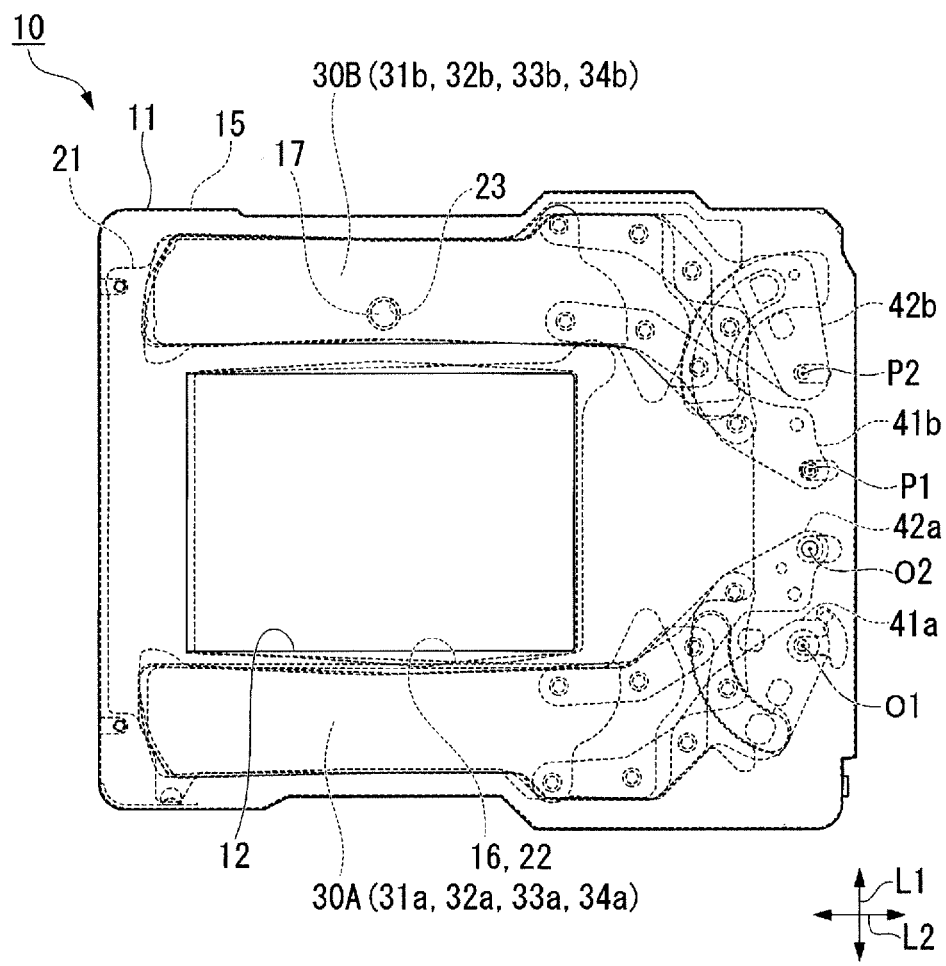
FIG. 3 is a front view of the focal-plane shutter according to the embodiment and shows a state during light exposure.
Figure 4:
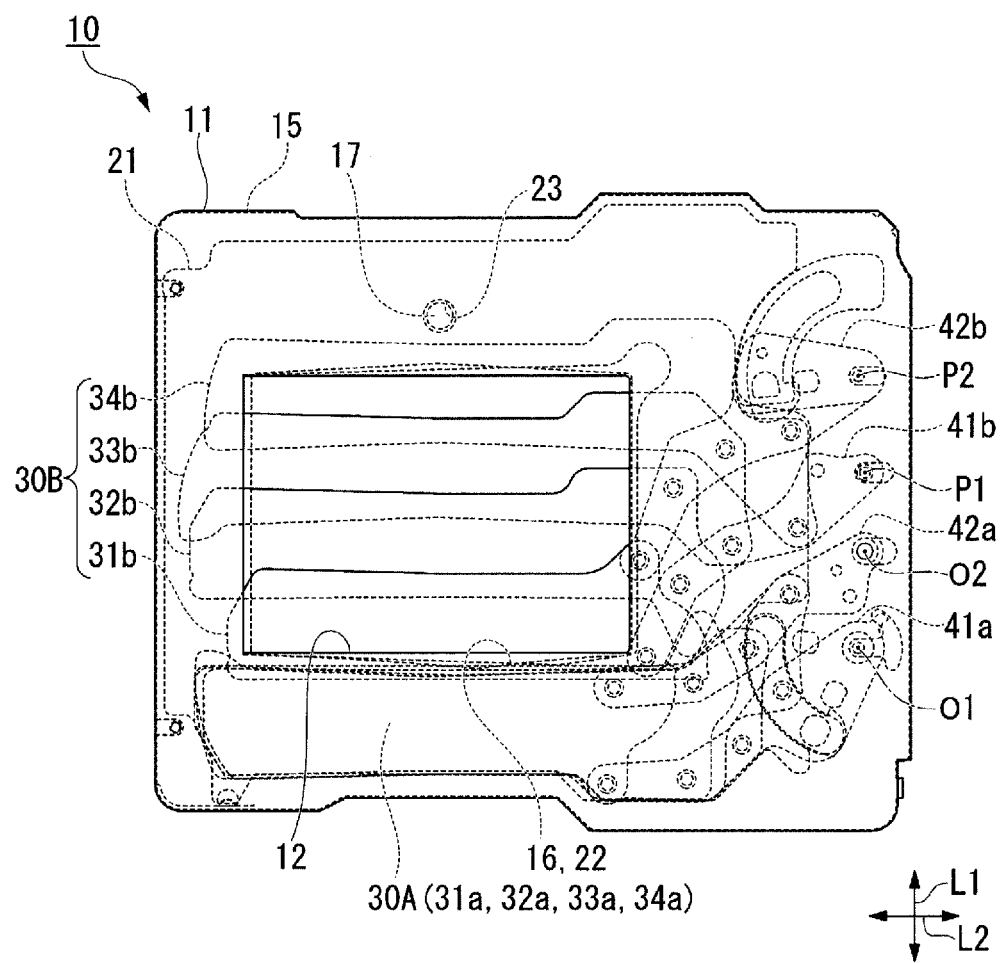
FIG. 4 is a front view of the focal-plane shutter according to the embodiment and shows a state immediately after the light exposure ends.
Figure 5:
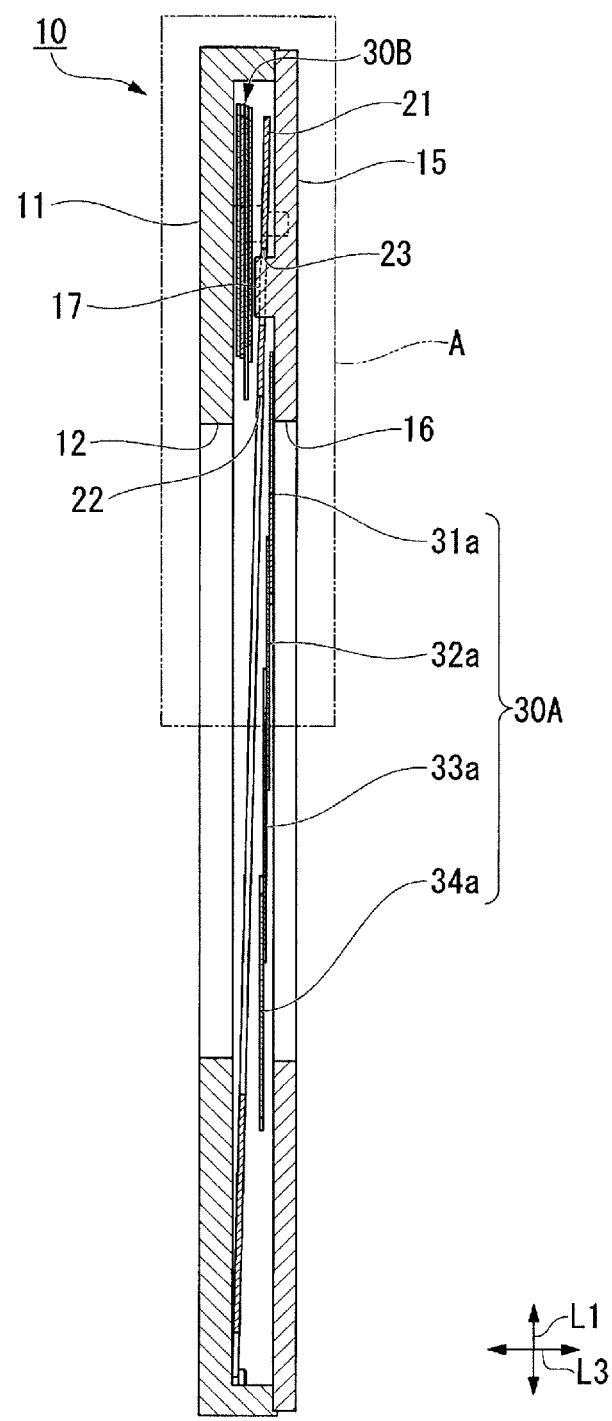
FIG. 5 is a cross-sectional view of the focal-plane shutter taken along the line V-V in FIG. 2.

FIGS. 2 to 4 are front views of the focal-plane shutter according to a first embodiment FIG. 2 shows an initial state (charged state). FIG. 3 shows a state during light exposure. FIG. 4 shows a state immediately after the light exposure ends (light exposure end state). FIG. 5 is a cross-sectional view of the focal-plane shutter taken along the line V-V in FIG. 2.

The focal-plane shutter 10 primarily includes a base plate 11 (first substrate), a blade receiving plate 15 (second substrate), a partitioning plate 21, a front curtain 30A (curtain), and a rear curtain 3OB (curtain), as shown in FIG. 2.

The base plate 11 is made, for example, of a synthetic resin and has a rectangular first opening 12. Among the members that form the focal-plane shutter 10, the base plate 11 is a member arranged in a position closest to the lens in the optical apparatus 1.

The blade receiving plate 15 is so arranged behind the base plate 11 as to face the base plate 11 (see FIG. 5). The blade receiving plate 15 is made, for example, of a synthetic resin or a metal material and has a rectangular second opening 16. The second opening 16 is formed in a position corresponding to the first opening 12 of the base plate 11. The second opening 16 is so formed as to roughly coincide with the first opening 12 in a front view. The blade receiving plate 15 is securely fastened to the base plate 11, for example, with screws.

The partitioning plate 21 is so arranged between the base plate 11 and the blade receiving plate 15 as to extend along the base plate 11 and the blade receiving plate 15 (see FIG. 5). The partitioning plate 21 is made, for example, of a synthetic resin and is so formed as to be slightly smaller than the base plate 11 and the blade receiving plate 15 in a plan view. The partitioning plate 21 has a rectangular third opening 22. The third opening 22 is formed in a position corresponding to the first opening 12 of the base plate 11. The third opening 22 is so formed as to roughly coincide with the first opening 12 and the second opening 16 of the blade receiving plate 15 in the front view. The partitioning plate 21 is fixed to the base plate 11 in such a way that an outer circumferential portion thereof is actually fixed to the base plate 11.

The front curtain 30A and the rear curtain 30B are arranged between the base plate 11 and the blade receiving plate 15. Each of the front curtain 30A and the rear curtain 30B moves between an open position where the openings 12, 16, and 22 are entirely open and a closed position where the openings 12, 16, and 22 are entirely closed so as to allow the openings 12, 16, and 22 to be open and closed (see FIGS. 2 to 4). FIG. 2 shows a case where the front curtain 30A is located in the closed position and the rear curtain 30B is located in the open position. FIG. 3 shows a case where the front curtain 30A and the rear curtain 30B are both located in the open position. FIG. 4 shows a case where the front curtain 30A is located in the open position and the rear curtain 30B is located in the closed position. The front curtain 30A and the rear curtain 30B are so provided in the state in which they are both located in the open position that the front curtain 30A is located on one side of the first opening 12 in the widthwise direction thereof and the rear curtain 30B is located on the other side (see FIG. 3).

The front curtain 30A is disposed between the blade receiving plate 15 and the partitioning plate 21 (see FIG. 5). The front curtain 30A includes blades 31a to 34a. The blades 31a to 34a unfold in the closed position and retract in the open position with the blades 31a to 34a overlapped on each other. In the closed position, the blades 31a to 34a are arranged in the order of the blades 34a, 33a, 32a, and 31a from the upstream side toward the downstream side in the direction in which the front curtain 30A moves from the open position to the closed position.

The rear curtain 30B is disposed between the base plate 11 and the partitioning plate 21, as shown in FIG. 5. The rear curtain 30B includes blades 31b to 34b, as shown in FIG. 4. The blades 31b to 34b unfold in the closed position and retract in the open position with the blades 31b to 34b overlapped on each other. In the closed position, the blades 31b to 34b are arranged in the order of the blades 34b, 33b, 32b, and 31b from the upstream side to the downstream side in the direction in which the rear curtain 30B moves from the open position to the closed position.

Each of the blades 31a to 34a and 31b to 34b is made, for example, of a synthetic resin and so formed as to be thin. The blades 31a to 34a and 31b to 34b extend along the direction perpendicular to the direction in which the blades move from the open position toward the closed position (predetermined direction). The direction in which the blades 31a to 34a move from the open position toward the closed position coincides with the direction in which the blades 31b to 34b move from the closed position toward the open position. In the following description, the movement direction of the blades 31a to 34a and 31b to 34b is defined as a first direction L1. Further, the direction perpendicular to the first direction L1 is defined as a second direction L2. The first direction L1 coincides with the widthwise direction of the first opening 12, and the second direction L2 coincides with the longitudinal direction of the first opening 12. Further, the direction perpendicular to the first direction L1 and the second direction L2 coincides with the direction of the optical axis direction (direction in which first opening 12 passes through base plate 11). In the following description, the optical axis direction is labeled with reference character L3. It is noted that the blades 31a to 34a and 31b to 34b are not necessarily made of a synthetic resin. The blades 31a to 34a and 31b to 34b may instead be made of a metal or a carbon fiber composite material.

The blades 31a to 34a are connected to front curtain drive arms 41a and 42a, as shown in FIG. 2. The front curtain drive arms 41a and 42a are disposed between the blade receiving plate 15 and the partitioning plate 21. Each of the front curtain drive arms 41a and 42a is formed of a thin metal plate so that the strength thereof is maintained. A base end portion of the front curtain drive arm 41a is so supported by the base plate 11 as to be swingable around a swing center O1. A base end portion of the front curtain drive arm 42a is so supported by the base plate 11 as to be swingable around a swing center O2.

The blade 31a, specifically, one end portion thereof along the second direction L2 is rotatably connected to front end portions of the front curtain drive arms 41a and 42a. The blade 32a, specifically, one end portion thereof along the second direction L2 is rotatably connected to the front curtain drive arms 41a and 42a, specifically, portions thereof shifted toward the base end thereof from the portions where the blade 31a is connected thereto. The blade 33a, specifically, one end portion thereof along the second direction L2 is rotatably connected to the front curtain drive arms 41a and 42a, specifically, portions thereof shifted toward the base end thereof from the portions where the blade 32a is connected thereto. The blade 34a, specifically, one end portion thereof along the second direction L2 is rotatably connected to the front curtain drive arms 41a and 42a, specifically, portions thereof shifted toward the base end thereof from the portions where the blade 33a is connected thereto. Each of the blades 31a to 34a, along with the front curtain drive arms 41a and 42a, functions as a parallel link mechanism.

The blades 3 lb to 34b are connected to the rear curtain drive arms 41b and 42b, as shown in FIG. 4. The rear curtain drive arms 41b and 42b are disposed between the base plate 11 and the partitioning plate 21. Each of the rear curtain drive arms 41b and 42b is formed of a thin metal plate so that the strength thereof is maintained, as in the case of the front curtain drive arms 41a and 42a. A base end portion of the rear curtain drive arm 41b is so supported by the base plate 11 as to be swingable around a swing center PI. A base end portion of the rear curtain drive arm 42b is so supported by the base plate 11 as to be swingable around a swing center P2.

The blade 31b, specifically, one end portion thereof along the second direction L2 is rotatably connected to front end portions of the rear curtain drive arms 41b and 42b. The blade 32b, specifically, one end portion thereof along the second direction L2 is rotatably connected to the rear curtain drive arms 41b and 42b, specifically, portions thereof shifted toward the base end thereof from the portions where the blade 31b is connected thereto. The blade 33b, specifically, one end portion thereof along the second direction L2 is rotatably connected to the rear curtain drive arms 41b and 42b, specifically, portions thereof shifted toward the base end thereof from the portions where the blade 32b is connected thereto. The blade 34b, specifically, one end portion thereof along the second direction L2 is rotatably connected to the rear curtain drive arms 41b and 42b, specifically, portions thereof shifted toward the base end thereof from the portions where the blade 33b is connected thereto. Each of the blades 31b to 34b, along with the rear curtain drive arms 41b and 42b, functions as a parallel link mechanism.

The base plate 11 is provided with a front curtain drive lever (not shown) for driving the front curtain drive arm 41a and a rear curtain drive lever (not shown) for driving the rear curtain drive arm 42b. Each of the front curtain drive lever and the rear curtain drive lever is so supported by the base plate 11 as to be swingable over a predetermined range. Specifically, the front curtain drive lever is so supported as to be swingable around an axis formed through the base plate 11, and the front curtain drive lever is inserted into a groove formed in the base plate 11 so that the swingable range of the front curtain drive lever is restricted. The same holds true for the rear curtain drive lever.

Each of the front curtain drive lever and the rear curtain drive lever is caused to swing by a drive source that is not shown. The drive source can, for example, be a driver that drives the drive levers on the basis of an effect produced by an electromagnet and a spring or any other urging member or an electromagnetic actuator including a rotor, a stator, and a coil.

The front curtain drive arm 41a is connected to the front curtain drive lever (not shown). The rear curtain drive arm 42b is connected to the rear curtain drive lever (not shown). When the front curtain drive lever swings, the front curtain drive arm 41a swings and moves the front curtain 30A. Similarly, when the rear curtain drive lever swings, the rear curtain drive arm 42b swings and moves the rear curtain 30B.

Figure 6:
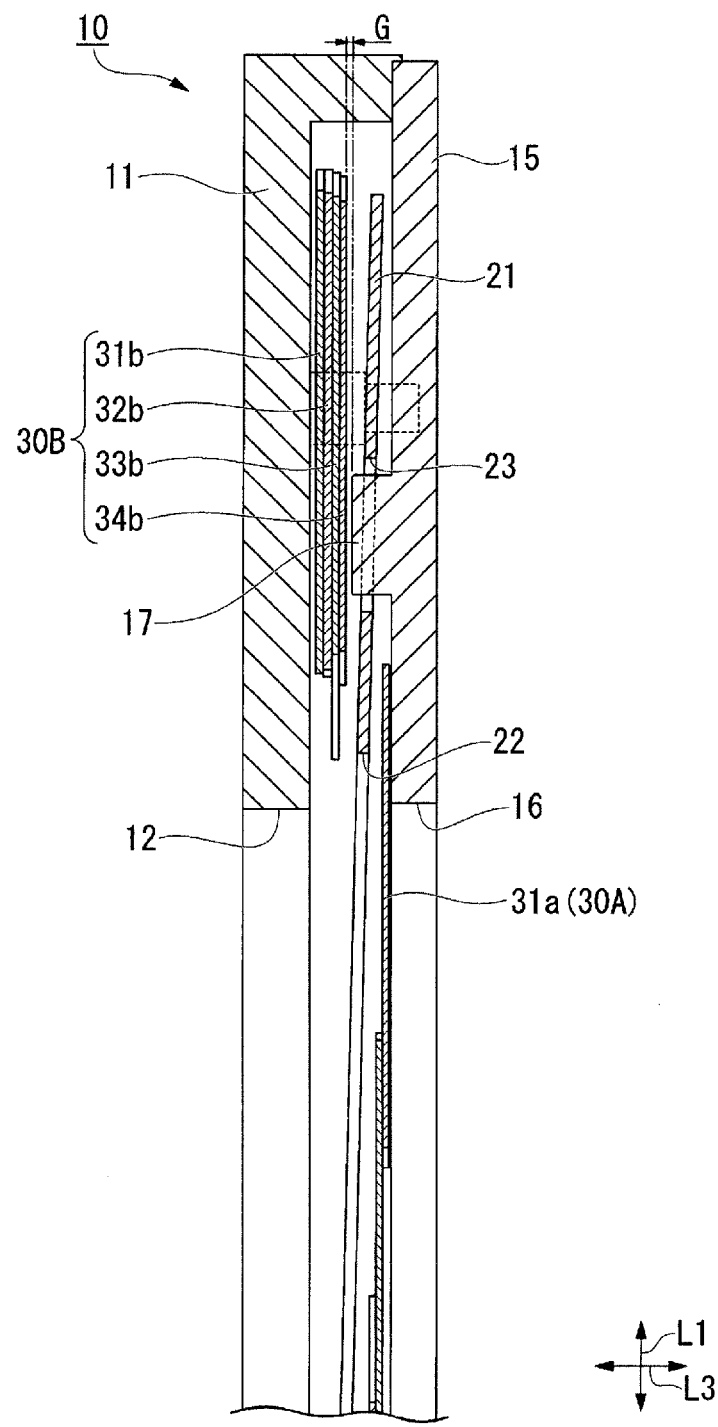
FIG. 6 is an enlarged cross-sectional view of a portion A in FIG. 5.

FIG. 6 is an enlarged cross-sectional view of a portion A in FIG. 5.

The blade receiving plate 15 has a protruding section 17, which protrudes along the optical axis direction L3 toward the rear curtain 30B, in a position where the blade receiving plate 15 overlaps with the rear curtain 30B located in the open position when viewed along the optical axis direction L3. The protruding section 17 is formed in a cylindrical shape. The protruding section 17 is inserted through (arranged in) a circular-hole-shaped clearance section 23, which is formed in the partitioning plate 21, as shown in FIG. 6. A front end portion of the protruding section 17 protrudes from the partitioning plate 21 toward the rear curtain 30B located in the open position. The front end portion of the protruding section 17 is formed in a planar shape extending along the first direction L1 and the second direction L2. The front end portion of the protruding section 17 is so formed as to be separate from the rear curtain 30B located in the open position by a predetermined gap G. The predetermined gap G is, for example, equal to the thickness of any of the blades 31b to 34b of the rear curtain 30B.

The action and effect of the focal-plane shutter 10 according to the present embodiment will be described below.

The focal-plane shutter 10 is so configured in the initial state that the front curtain 30A is located in the closed position and the rear curtain 30B is located in the open position, as shown in FIG. 2.

When a release button of the optical apparatus 1 is pressed in image capturing, the front curtain drive lever rotates. As a result, the front curtain 30A starts light exposure to achieve the state in which the openings 12, 16, and 22 are open, as shown in FIG. 3. The rear curtain 30B is maintained in the state in which the openings 12, 16, and 22 are open for a predetermined period. As a result, the state in which the openings 12, 16, and 22 are open (light exposure state) is achieved.

After a predetermined period has elapsed since the release button was pressed, the rear curtain drive lever rotates. As a result, the rear curtain 30B moves from the open position to the closed position to close the openings 12, 16, and 22 and therefore terminate the light exposure, as shown in FIG. 4. Single image capturing thus ends.

A set lever that is not shown then rotates the front curtain drive lever and the rear curtain drive lever in the direction opposite the direction in which the drive levers rotate in the image capturing action. As a result, the front curtain 30A unfolds to close the openings 12, 16, and 22, and the rear curtain 30B retracts to open the openings 12, 16, and 22, so that the initial state shown in FIG. 2 is restored.

When the rear curtain 30B moves from the closed position to the open position, the rear curtain drive lever comes into contact with, at the end position of the movement, an end portion of the groove which is formed in the base plate 11 and into which the rear curtain drive lever is inserted. When the rear curtain drive lever comes into contact with the end portion of the groove, the blades 31b to 34b of the rear curtain 30B are deformed in some cases due to the inertia of the rear curtain during the movement. The deformed rear curtain 30B is displaced from a default position in the optical axis direction L3 in some cases. The protruding section 17 protrudes from the partitioning plate 21 along the optical axis direction L3 in the space between the base plate 11 and the partitioning plate 21 where the rear curtain 30B located in the closed position is arranged. Therefore, a situation in which the rear curtain 30B located in the open position is displaced in the optical axis direction L3 can be avoided.

In continuous light exposure (continuous photographing action), the rear curtain 30B moves from the closed position to the open position and then starts, after a predetermined period elapses, moving back to the closed position. In this process, the protruding section 17 prevents the rear curtain 30B in the open position from being displaced in the optical axis direction L3, as described above. Therefore, when the rear curtain 30B starts moving toward the closed position, the rear curtain 30B is allowed to move with the displacement thereof in the optical axis direction L3 eliminated, whereby the rear curtain 30B is allowed to move in a stable state.

As described above, according to the present embodiment, since the protruding section 17, which protrudes toward the rear curtain 30B and allows the rear curtain 30B to come into contact with the protruding section 17, is provided in the position where the blade receiving plate 15 overlaps with the rear curtain 30B located in the open position when viewed along the optical axis direction L3, causing the rear curtain 30B to come into contact with the protruding section 17 in the open position allows restriction of displacement of the rear curtain 30B in the optical axis direction L3. As a result, after the displacement of the rear curtain 30B in the optical axis direction L3 is eliminated in the open position, the rear curtain 30B is allowed to move to the closed position. The rear curtain 30B can therefore be stabilized in the continuous photographing action, whereby variation in light exposure period can be suppressed.

Further, the protruding section 17 is provided to the blade receiving plate 15 fixed to the base plate 11, for example, with screws. The impact produced when the rear curtain 30B comes into contact with the blade receiving plate 15 can be more effectively received by the blade receiving plate 15 via the protruding section 17 than, for example, in a configuration in which the rear curtain 30B is caused to come into contact with the partitioning plate 21 formed to be thinner than the blade receiving plate 15, whereby the displacement of the rear curtain 30B in the optical axis direction L3 can be reliably restricted.

In general, the rear curtain 30B moves from the open position to the closed position in the light exposure action. According to the present embodiment, the protruding section 17 arranged in the clearance section 23 can restrict displacement of the rear curtain 30B in the optical axis direction L3 that is arranged between the base plate 11 and the partitioning plate 21 and located in the open position. As a result, after the displacement of the rear curtain 30B in the optical axis direction L3 is eliminated in the open position, the rear curtain 30B is allowed to move toward the closed position. The rear curtain 30B can therefore be stabilized in the continuous photographing action, whereby variation in light exposure period can be suppressed.

Further, since the front end portion of the protruding section 17 is so formed as to be separate from the rear curtain 30B located in the open position by the predetermined gap G, a situation in which the rear curtain 30B keeps in contact with the protruding section 17 can be avoided. Therefore, foreign matter is not produced due to sliding contact between the rear curtain 30B and the protruding section 17, or the rear curtain 30B is not scratched.

Moreover, since the front end portion of the protruding section 17 is so formed as to be separate from the rear curtain 30B located in the open position by the predetermined gap G, the rear curtain 30B can readily enter the space between the base plate 11 and the protruding section 17 when the rear curtain 30B moves from the closed position toward the open position. The continuous photographing action can therefore be smoothly performed.

In the assembly of the focal-plane shutter 10, after the partitioning plate 21 is attached to the base plate 11, the blade receiving plate 15 is attached to the base plate 11. In this process, inserting the protruding section 17 of the blade receiving plate 15 through the clearance section 23 formed in the partitioning plate 21 allows the blade receiving plate 15 to be positioned with respect to the base plate 11. The focal-plane shutter 10 can therefore be readily assembled.

The optical apparatus 1 according to the present embodiment, which includes the focal-plane shutter 10, allows suppression of variation in light exposure period and therefore allows a high-quality image to be captured.

A focal-plane shutter 110 according to a first variation of the embodiment will next be described.

Figure 7:
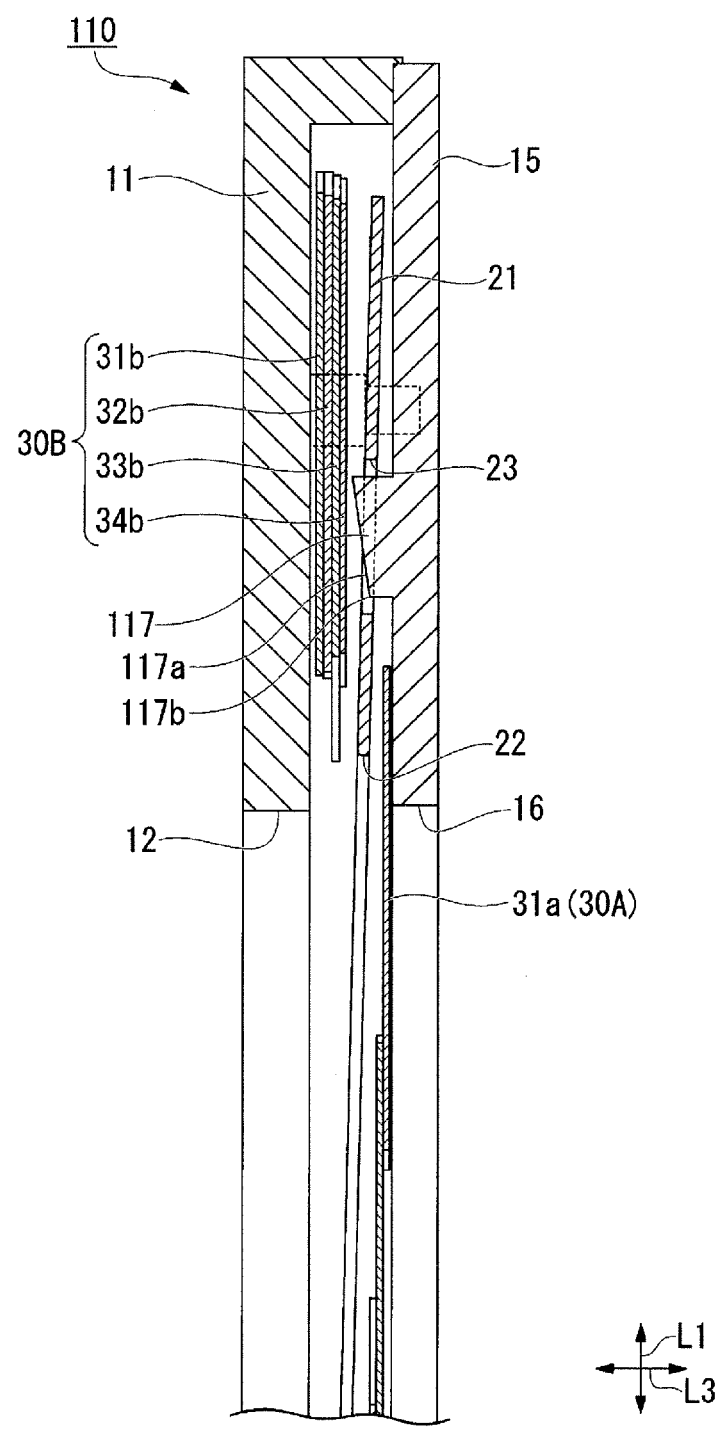
FIG. 7 describes a focal-plane shutter according to a first variation of the embodiment and is an enlarged cross-sectional view of a portion corresponding to the portion A in FIG. 5.

FIG. 7 describes the focal-plane shutter according to the first variation of the embodiment and is an enlarged cross-sectional view of a portion corresponding to the portion A in FIG. 5.

In the embodiment shown in FIG. 6, the front end portion of the protruding section 17 is formed in a planar shape extending along the first direction L1 and the second direction L2. In contrast, the first variation of the embodiment that is shown in FIG. 7 differs from the embodiment described above in that the front end portion of a protruding section 117 has an inclined surface 117a, which inclines with respect to the first direction L1. The same configurations as those in the embodiment have the same reference characters and will not be described in detail.

The blade receiving plate 15 has the protruding section 117, as shown in FIG. 7. The inclined surface 117a is formed at the front end portion of the protruding section 117. The inclined surface 117a so inclines as to separate away from the blade receiving plate 15 but approach the base plate 11 with distance from the side facing the closed position of the rear curtain 30B toward the side facing the open position thereof. The configuration described above is employed to avoid a situation in which open-position-side end portions of the blades 31b to 34b that are displaced in the optical axis direction L3 due to the deformation produced by the inertia of the blades during the movement hit the protruding section 117 and are caught by the protruding section 117 when the rear curtain 30B moves from the closed position toward the open position. As shown in FIG. 7, a configuration in which part of the inclined surface 117a, specifically, an edge 117b facing the closed position of the rear curtain 30B enters the clearance section 23 of the partitioning plate 21 reliably prevents the blades 31b to 34b from hitting the protruding section 117.

According to the configuration described above, since the inclined surface 117a, which causes the gap between the rear curtain 30B and the protruding section 117 in the optical axis direction L3 to decrease as the rear curtain 30B moves from the closed position toward the open position, is formed at the front end portion of the protruding section 117, the rear curtain 30B is allowed to slide along the inclined surface 117a even when the rear curtain 30B displaced in the optical axis direction L3 due to the deformation produced by the inertia thereof during the movement moves from the closed position to the open position and comes into contact with the front end portion of the protruding section 117. As a result, the rear curtain 30B is not caught by the protruding section 117 but is allowed to move, whereby the continuous photographing action can be smoothly performed.

A focal-plane shutter 210 according to a second variation of the embodiment will next be described.

Figure 8:
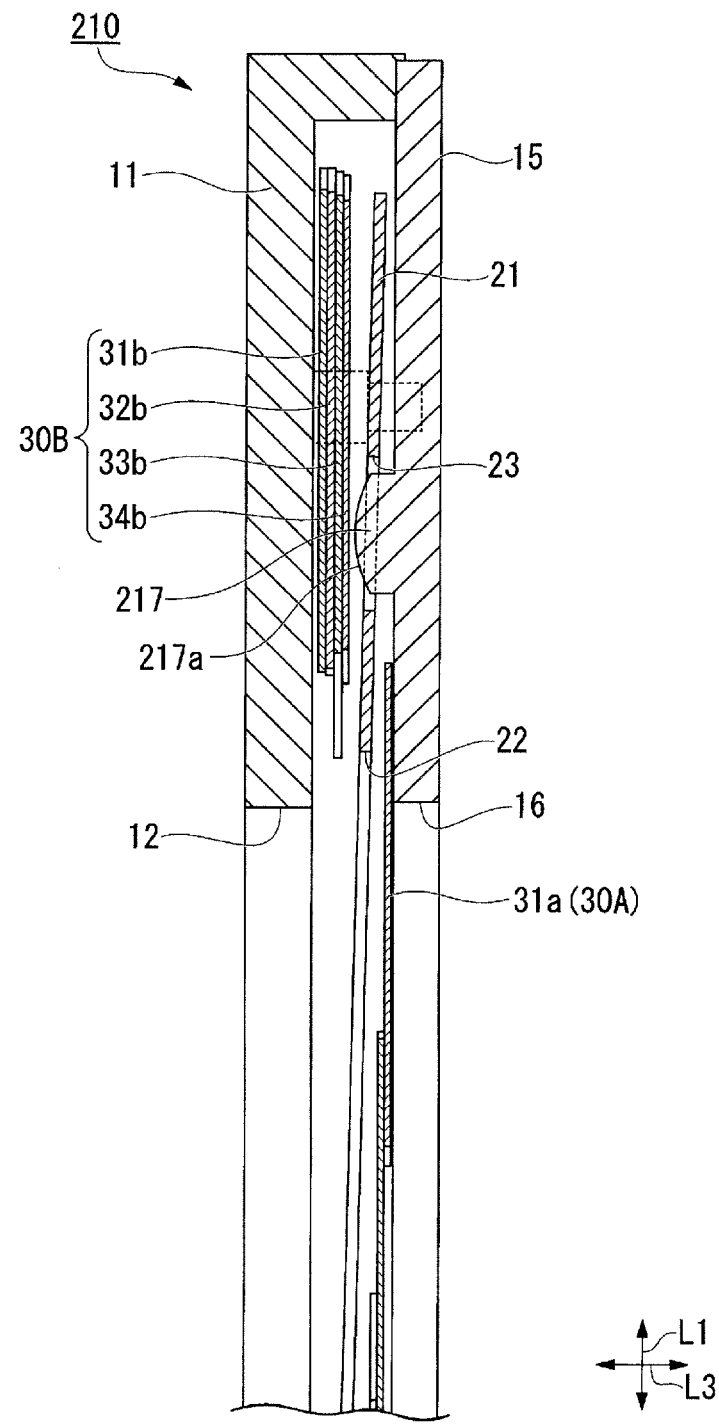
FIG. 8 describes a focal-plane shutter according to a second variation of the embodiment and is an enlarged cross-sectional view of a portion corresponding to the portion A in FIG. 5.

FIG. 8 describes the focal-plane shutter according to the second variation of the embodiment and is an enlarged cross-sectional view of a portion corresponding to the portion A in FIG. 5.

In the embodiment shown in FIG. 6, the front end portion of the protruding section 17 is formed in a planar shape. In contrast, the second variation of the embodiment that is shown in FIG. 8 differs from the embodiment described above in that the front end portion of a protruding section 217 is formed in a spherical shape. The same configurations as those in the embodiment have the same reference characters and will not be described in detail.

The blade receiving plate 15 has the protruding section 217, as shown in FIG. 8. The front end portion of the protruding section 217 is formed in a spherical shape that swells toward the base plate 11 along the optical axis direction L3.

The configuration allows the rear curtain 30B located in the open position to come into contact with the curved surface portion of the front end portion of the protruding section 217, whereby a situation in which the rear curtain 30B is scratched can be avoided.

A surface 271a, which is part of the front end portion of the protruding section 217 and faces the closed position of the rear curtain 30B in the first direction L1, is so curved as to warp from the side facing the blade receiving plate 15 toward the side facing the base plate 11 with distance from the closed position of the rear curtain 30B toward the open position thereof. Therefore, even in a case where the rear curtain 3 OB comes into contact with the front end portion of the protruding section 217 when the rear curtain 30B moves from the closed position to the open position, the rear curtain 30B is allowed to slide along the front end portion of the protruding section 217. As a result, the rear curtain 30B is not caught by the protruding section 217 but is allowed to move, whereby continuous photographing action can be smoothly performed.

A focal-plane shutter 310 according to a third variation of the embodiment will next be described.

Figure 9:
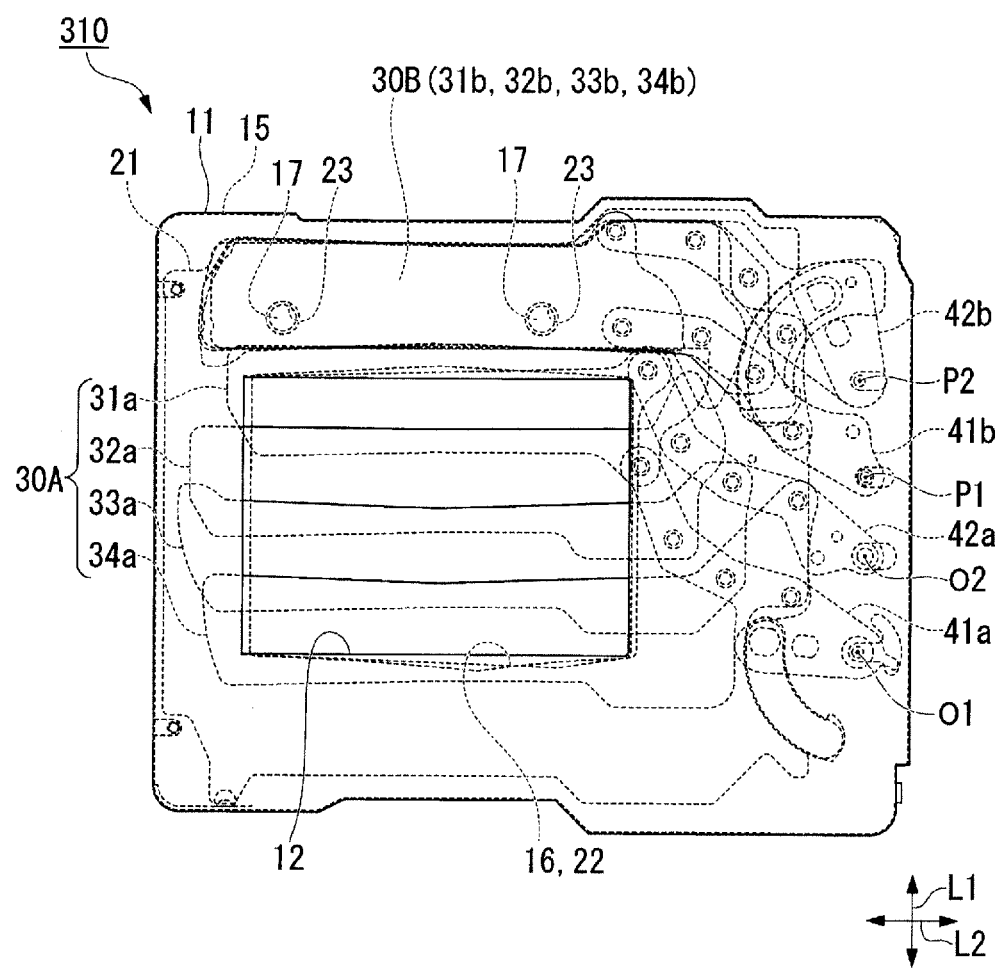
FIG. 9 is a front view of a focal-plane shutter according to a third variation of the embodiment and shows an initial state.

FIG. 9 is a front view of the focal-plane shutter according to the third variation of the embodiment and shows an initial state.

In the embodiment shown in FIG. 2, one protruding section 17 is provided. In contrast, the third variation of the embodiment that is shown in FIG. 9 differs from the embodiment described above in that a plurality of protruding sections 17 (two in the present variation) are provided. The same configurations as those in the embodiment have the same reference characters and will not be described in detail.

The blade receiving plate 15 has a plurality of protruding sections 17, as shown in FIG. 9. The plurality of protruding sections 17 are arranged in the second direction L2.

According to the configuration, since the displacement of the rear curtain 30B in the optical axis direction L3 can be restricted at a plurality of locations, the displacement of the rear curtain 30B in the optical axis direction L3 can be reliably eliminated in the open position.

Further, since the protruding sections 17 are arranged in the second direction L2, in which the blades 31b to 34b extend, the displacement of the blades 31b to 34b in the optical axis direction L3 can be restricted over a wider range, whereby the displacement of the rear curtain 30B in the optical axis direction L3 can be reliably eliminated in the open position. The rear curtain 30B can therefore be stabilized in the continuous photographing action, whereby variation in light exposure period can be suppressed.

In the present variation, two protruding sections 17 are provided, but the number of protruding sections 17 is not limited to two, and three or more protruding sections 17 may be provided.

A focal-plane shutter 410 according to a fourth variation of the embodiment will next be described.

Figure 10:
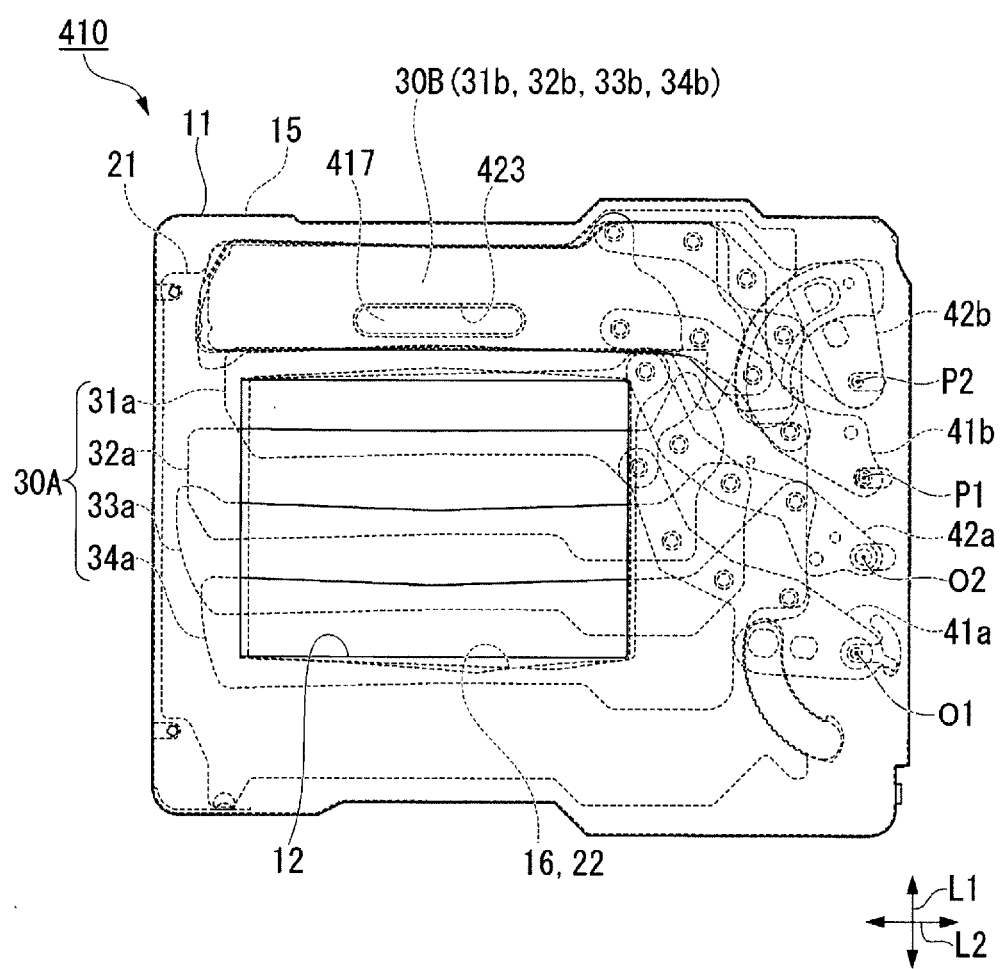
FIG. 10 is a front view of a focal-plane shutter according to a fourth variation of the embodiment and shows an initial state.

FIG. 10 is a front view of the focal-plane shutter according to the fourth variation of the embodiment and shows an initial state.

In the embodiment shown in FIG. 2, the protruding section 17 is formed in a cylindrical shape. In contrast, the fourth variation of the embodiment that is shown in FIG. 10 differs from the embodiment described above in that a protruding section 417 is formed in an oval columnar shape in a transverse cross-sectional view. The same configurations as those in the embodiment have the same reference characters and will not be described in detail.

The blade receiving plate 15 has the protruding section 417, as shown in FIG. 10. The protruding section 417 is formed in a columnar shape protruding along the optical axis direction L3. The protruding section 417 is formed in an oval shape extending along the second direction L2 in a transverse cross-sectional view viewed in the optical axis direction L3. The protruding section 417 is inserted (arranged) through an oval-hole-shaped clearance section 423 formed in the partitioning plate 21.

According to the configuration, since the protruding section 417 extends along the second direction L2, in which the blades 31b to 34b extend, the displacement of the blades 31b to 34b in the optical axis direction L3 can be restricted over a wider range, whereby the displacement of the rear curtain 30B in the optical axis direction L3 can be reliably eliminated in the open position. The rear curtain 30B can therefore be stabilized in the continuous photographing action, whereby variation in light exposure period can be suppressed.

The invention is not limited to the embodiments described above with reference to the drawings, and a variety of variations are conceivable within the technical range of the invention.

For example, in the embodiments described above, each of the protruding sections 17, 117, 217, and 417 is provided integrally with the blade receiving plate 15, but not necessarily. For example, a protruding section formed as a member separate from the blade receiving plate may be attached to the blade receiving plate.

Each of the focal-plane shutters 10, 110, 210, 310, and 410 according to the embodiments described above has the front curtain 30A and the rear curtain 30B, but not necessarily. For example, each of the focal-plane shutters may include only the rear curtain 30B as the curtain, and the controller 2 of the optical apparatus 1 may be provided with an electronic front curtain function in which the controller 2 electronically controls the imaging device 4 to cause the imaging device 4 to perform the front curtain action.

In the embodiments described above, each of the protruding sections 17, 117, 217, and 417 is provided to the blade receiving plate 15 in such a way that the rear curtain 30B is allowed to come into contact with the protruding section, but not necessarily. Each of the protruding sections may be provided to the base plate 11 in such a way that the front curtain 30A is allowed to come into contact with the protruding section, and an inclined surface that inclines with respect to the first direction L1 may be formed to a front end portion of the protruding section provided to the base plate 11. In this case, the inclined surface so inclines as to separate away from the base plate 11 but approach the blade receiving plate 15 with distance from the side facing the closed position of the front curtain 30A toward the side facing the open position thereof.

In addition to the above, each constituent element in the embodiments described above can be replaced with a known constituent element as appropriate to the extent that the replacement does not depart from the substance of the invention.

What is claimed is:

1. A focal-plane shutter assembled in an optical axis direction, the focal-plane comprising:
    a first planar substrate arranged in a deployment direction perpendicular to the optical axis direction and having a first opening formed therein extensive in the deployment direction;
    a second planar substrate so arranged as to face the first planar substrate substantially in parallel to the first planar substrate and having a second opening formed therein in alignment with the first opening along the optical axis direction;
    a curtain arranged between the first planar substrate and the second planar substrate and operable in the deployment direction between an open position where the curtain is retracted to open the first opening and the second opening and a closed position where the curtain is deployed to close the first opening and the second opening to close the first opening and the second opening;
    a lever mechanism operable to deploy or retract the curtain between the open position and the closed position; and
    a protruding section protruding in the optical axis direction from the second planar substrate towards the curtain retracted at the open position, wherein the protruding section so protrudes toward the curtain that it has a clearance with the curtain settled at the open position, whereas it comes into contact with the curtain retracting toward the open position with a displacement in the optical axis direction to bring the curtain in settlement at the open position.

2. The focal-plane shutter according to claim 1, further comprising a partitioning plate arranged in the deployment direction between the first planar substrate and the second planar substrate,
    wherein the curtain includes a rear curtain operable to deploy or retract between the first planar substrate and the partition plate between the open and closed positions,
    the partitioning plate is formed with a hole through which the protruding section protrudes towards the rear curtain retracted at the open position, and
    the protruding section so protrudes toward the rear curtain that it has a clearance with the rear curtain settled at the open position, whereas it comes into contact with the rear curtain retracting toward the open position with a displacement in the optical axis direction to bring the rear curtain in settlement at the open position.

3. The focal-plane shutter according to claim 1, further comprising a partitioning plate arranged in the deployment direction between the first planar substrate and the second planar substrate,
    wherein the curtain includes a front curtain operable to deploy or retract between the first planar substrate and the partition plate between the open and closed positions,
    the partitioning plate is formed with a hole through which the protruding section protrudes toward the rear curtain retracted at the open position, and
    the protruding section so protrudes toward the front curtain that it has a clearance withthe front curtain settled at the open position, whereas it comes into contact with the front curtain retracting toward the open position with a displacement in the optical axis direction to bring the rear curtain in settlement at the open position.

4. The focal-plane shutter according to claim 1, wherein the protruding section is comprised of a plurality of protruding members.

5. The focal-plane shutter according to claim 4,
    wherein the curtain is comprised of a set of blades each extending in a longitudinal direction perpendicular to both the optical axis direction and the deployment direction and arranged in an overlapping manner in the optical axis direction, the set of blades being operable to deploy to the closed position, where the set of blades reduces their overlapping areas among them and retract to the open position, where the set of blades increases their overlapping areas among them, and
    the protruding members are arranged in the longitudinal direction.

6. The focal-plane shutter according to claim 1,
    wherein the curtain is composed of a set of blades each extending in a longitudinal direction perpendicular to both the optical axis direction and the deployment direction and arranged in an overlapping manner in the optical axis direction, the set of blades being operable to deploy to the closed position, where the set of blades reduces their overlapping areas among them and retract to the open position, where the set of blades increases their overlapping areas among them.

7. The focal-plane shutter according to claim 1, wherein the protruding section is formed with a planar surface at a first end thereof opposite to a base end thereof attached to the second planar substrate, the planar surface being inclined with distances measured from the surface to the curtain in the optical axis direction that become shorter toward the open position in the deployment direction.

8. The focal-plane shutter according to claim 6, wherein the protruding section has a first end opposite to a base end thereof attached to the second planar substrate, and the first end thereof is separate by a thickness of one of the blades from the curtain settled at the open position.

9. An optical apparatus comprising the focal-plane shutter according to claim 1.

* * * * *